(12) United States Patent
Ozeki et al.

(10) Patent No.: US 11,787,143 B2
(45) Date of Patent: Oct. 17, 2023

(54) HOT PRESS CUSHIONING MATERIAL

(71) Applicant: YAMAUCHI CORP., Hirakata (JP)

(72) Inventors: Takamitsu Ozeki, Tochigi (JP); Akira Yoshida, Tochigi (JP); Shuhei Kouno, Tochigi (JP)

(73) Assignee: YAMAUCHI CORP., Hirakata (JP)

( * ) Notice: Subject to any disclaimer, the term of this patent is extended or adjusted under 35 U.S.C. 154(b) by 220 days.

(21) Appl. No.: 17/281,483

(22) PCT Filed: Sep. 30, 2019

(86) PCT No.: PCT/JP2019/038542
§ 371 (c)(1),
(2) Date: Mar. 30, 2021

(87) PCT Pub. No.: WO2020/071322
PCT Pub. Date: Apr. 9, 2020

(65) Prior Publication Data
US 2021/0402726 A1 Dec. 30, 2021

(30) Foreign Application Priority Data
Oct. 5, 2018 (JP) .................................. 2018-190484

(51) Int. Cl.
| | |
|---|---|
| *B30B 15/06* | (2006.01) |
| *B29C 43/36* | (2006.01) |
| *B32B 25/08* | (2006.01) |
| *B32B 25/10* | (2006.01) |
| *B32B 37/26* | (2006.01) |

(52) U.S. Cl.
CPC ........ *B30B 15/061* (2013.01); *B29C 43/3642* (2013.01); *B32B 25/08* (2013.01); *B32B 25/10* (2013.01); *B29C 2043/3655* (2013.01); *B29K 2995/0016* (2013.01); *B32B 2037/266* (2013.01); *B32B 2307/306* (2013.01)

(58) Field of Classification Search
CPC .............. B30B 15/061; B29C 43/3642; B29C 2043/3655; B32B 25/08; B32B 25/10; B32B 2037/266; B32B 2307/306; B29K 2995/0016
See application file for complete search history.

(56) References Cited

FOREIGN PATENT DOCUMENTS

| | | |
|---|---|---|
| EP | 2098350 B1 | 8/2013 |
| JP | S53-016065 U | 2/1978 |
| JP | 353123678 U | 10/1978 |
| JP | 3303658 B2 | 7/2002 |
| JP | 2006-026673 A | 2/2006 |

(Continued)

OTHER PUBLICATIONS

Machine Translation of WO2017175734 A; Inventor: Shigeru Nakano; Publication: Oct. 12, 2017.*

(Continued)

*Primary Examiner* — Vishal I Patel
(74) *Attorney, Agent, or Firm* — HAUPTMAN HAM, LLP

(57) ABSTRACT

A hot press cushioning material includes a base material layer that is in the form of a plate and that contains fibers; and an end face seal covering an outer end face of the base material layer. The end face seal includes a heat resistant elastic body having penetrated the outer end face of the base material layer and a heat resistant resin attached to an outer surface of the heat resistant elastic body.

7 Claims, 8 Drawing Sheets

(56) References Cited

FOREIGN PATENT DOCUMENTS

| JP | 2009-000741 A | 1/2009 | |
|---|---|---|---|
| JP | 2014-087999 A | 5/2014 | |
| JP | 2016-168845 A | 9/2016 | |
| JP | 2017-185706 A | 10/2017 | |
| TW | 201422402 A | 6/2014 | |
| TW | 201736106 A | 10/2017 | |
| WO | 2017175734 A1 | 10/2017 | |
| WO | WO-2017175734 A1 * | 10/2017 | ............ B29C 43/32 |

OTHER PUBLICATIONS

Extended European Search Report issued in corresponding European Application No. 19868325.2, dated May 31, 2022, pp. 1-11, European Patent Office, Munich, Germany.

International Search Report issued in corresponding International Application No. PCT/JP2019/038542, dated Nov. 26, 2019, pp. 1-2, Japan Patent Office, Tokyo, Japan.

* cited by examiner (a) EXAMPLE 1      (b) COMPARATIVE EXAMPLE 1

(a) EXAMPLE 1

(b) EXAMPLE 2

(c) COMPARATIVE EXAMPLE 1

(d) COMPARATIVE EXAMPLE 2

(e) COMPARATIVE EXAMPLE 3

(f) COMPARATIVE EXAMPLE 4

(g) COMPARATIVE EXAMPLE 5

(a) EXAMPLE 1

(b) EXAMPLE 2

(c) COMPARATIVE EXAMPLE 1

(d) COMPARATIVE EXAMPLE 2

(e) COMPARATIVE EXAMPLE 3

(f) COMPARATIVE EXAMPLE 4

(g) COMPARATIVE EXAMPLE 5

HOT PRESS CUSHIONING MATERIAL

CROSS-REFERENCE TO RELATED APPLICATIONS

The present application is a National Phase of International Application Number PCT/JP2019/038542, filed Sep. 30, 2019, which claims priority to Japanese Patent Application No. 2018-190484, filed Oct. 5, 2018, both which are hereby incorporated by reference in their entirety.

TECHNICAL FIELD

The present invention relates to hot press cushioning materials. More particularly, the present invention relates to hot press cushioning materials that are used when press forming or thermocompression bonding an intended product in the process of manufacturing a precision equipment component (hereinafter referred to as a "laminate" in the present invention) such as a printed circuit board like a copper clad laminate, a flexible printed circuit board, or a multilayer board, an IC card, a liquid crystal display panel, or a ceramic laminate.

BACKGROUND ART

As shown in FIG. 10(a), when manufacturing a laminate such as a printed circuit board, a laminate material 52 that is an object to be pressed is placed between heating platens 51 that are heating and pressing means, and a certain pressure and heat are applied to the laminate material 52 in a press forming or thermocompression bonding process. In order to produce an accurate formed product, it is necessary to uniformly apply heat and pressure to the entire surface of the laminate material 52 during hot press. For this purpose, hot press is performed with a flat plate-like cushioning material 1 interposed between each heating platen 51 and the laminate material 52. A mirror plate 54 is interposed between the laminate material 52 and each cushioning material.

General characteristics required for the cushioning material 1 include: cushioning properties that absorb unevenness of the heating platen 51 and the laminate material 52; in-plane uniformity for uniformly transferring heat and pressure from the heating platen 51 to the entire press surface of the laminate material 52; heat transfer properties for efficiently transferring heat from the heating platen 51 to the laminate material 52; and heat resistance high enough to withstand the press temperature.

Conventionally, a hot press cushioning material in the form of a plate is cut into a predetermined shape and size, but its cut end face is not subjected to any treatment and is exposed as it is. Accordingly, fiber fraying or fuzzing may occur on the outer end face of the cushioning material as the end face of the cushioning material is rubbed when the cushioning material is placed at a predetermined position or due to the compressive force or impact force that is applied to the cushioning material during use. Fine fibers thus came off may adhere to the surface of an object to be pressed.

Patent Literature 1 (Japanese Unexamined Patent Publication No. 2009-741) discloses a technique for preventing fibers from coming off from the end face of a hot press cushioning material by covering the end face of a laminated body with a heat resistant covering material. However, such coming-off of fibers from the end face of the cushioning material cannot be sufficiently prevented by merely attaching the covering material to the end face because the covering material easily peels off from the end face of the cushioning material due to an impact force etc. that is applied to the cushioning material during use.

A technique for solving such a problem is disclosed in Patent Literature 2 (Japanese Unexamined Patent Publication No. 2014-87999). Patent Literature 2 discloses preventing coming-off of fibers from the end face of a hot press cushioning material by impregnating the end face with a heat resistant elastic material.

On the other hand, before performing press forming or thermocompression bonding in the process of manufacturing a laminate, a stack of the cushioning materials 1 and the laminate material 52 is conveyed in a conveying direction B and is aligned lastly, as shown in FIG. 10(b). When the cushioning materials 1 and the laminate material 52 reach the position for alignment, alignment pins 53 shown by dashed lines stand up to apply an impact to the end faces (positions A) of the cushioning materials 1. Since the cushioning materials 1 are usually used repeatedly, an impact is repeatedly applied to substantially the same end faces (positions A) of the cushioning materials 1.

CITATION LIST

Patent Literatures

Patent Literature 1: Japanese Unexamined Patent Publication No. 2009-741
Patent Literature 2: Japanese Unexamined Patent Publication No. 2014-87999

SUMMARY OF INVENTION

Technical Problem

Patent Literature 2 proposes preventing coming-off of fibers from the end face of a cushioning material by impregnating the end face with a heat resistant elastic material. However, when the alignment pins 53 repeatedly apply an impact to the end faces (positions A) as shown in FIG. 10(b), fibers that are present near the end faces of the cushioning materials may be exposed and the exposed fibers may come off.

The present invention was made to solve the above problem, and it is an object of the present invention to provide a hot press cushioning material capable of sufficiently preventing coming-off of fibers from the end face of the cushioning material.

Solution to Problem

A hot press cushioning material according to the present invention includes: a base material layer that is in a form of a plate and that contains fibers; and an end face seal covering an outer end face of the base material layer. The end face seal includes a heat resistant elastic body that having penetrated the outer end face of the base material layer and a heat resistant resin attached to an outer surface of the heat resistant elastic body.

Preferably, the heat resistant elastic body includes a first portion having penetrated the base material layer inward from the outer end face and a second portion that is located on an outer surface side of the first portion and that does not penetrate the base material layer.

Preferably, the first portion of the heat resistant elastic body has a penetration depth of 10 μm or more, and the second portion sandwiched between the first portion and the heat resistant resin has a thickness of 10 μm or more.

Preferably, a surface layer is provided on front and back surfaces of the base material layer, and the first portion of the heat resistant elastic body has penetrated the base material layer sandwiched between the surface layers inward from the outer end face.

Preferably, the second portion of the heat resistant elastic body covers outer end faces of the surface layers.

Preferably, the heat resistant elastic body contains one kind of rubber or a mixture of two or more kind of rubbers selected from the group consisting of fluororubber, EPM, EPDM, hydrogenated nitrile rubber, silicone rubber, acrylic rubber, and butyl rubber.

Preferably, the heat resistant resin contains at least one resin selected from the group consisting of fluororesin, polyimide resin, polyamide resin, PPS resin, PET resin, polyurethane resin, polypropylene resin, and polyethylene resin.

Preferably, the heat resistant elastic body is fluororubber, and the heat resistant resin is fluororesin.

A method for manufacturing a hot press cushioning material according to the present invention includes: a step of preparing a base material layer that is in a form of a plate and that contains fibers; a step of preparing an end face seal material including a heat resistant elastic body that penetrates an outer end face of the base material layer and a heat resistant resin attached to an outer surface of the heat resistant elastic body; and a covering step of attaching the end face seal material to the outer end face of the base material layer to cover the outer end face of the base material layer.

Preferably, the covering step includes a thermocompression bonding step of thermocompression bonding the heat resistant elastic body of the end face seal material and the outer end face of the base material layer so that the end face seal material covers the outer end face of the base material layer, and a vulcanization step of vulcanizing the heat resistant elastic body of the end face seal material.

Advantageous Effects of Invention

The hot press cushioning material of the present invention can sufficiently prevent coming-off of fibers from the end face of the cushioning material.

Specifically, the heat resistant elastic body fills holes and bumps formed on the outer end face and enters fibers that are present near the outer end face and is cured. This provides an anchor effect on the fibers. Moreover, since the outer surface of the heat resistant elastic body is covered by the heat resistant resin, coming-off of the fibers from the outer end face of the base material layer can be prevented even when an impact is applied to the outer end face.

In the case where the heat resistant elastic body includes the first portion having penetrated the base material layer from the outer end face of the base material layer and the second portion that is located on the outer surface side of the first portion and that does not penetrate the base material layer, the second portion absorbs an impact that is applied to the outer end face by the elastic force of the second portion. The resistance to the impact that is applied to the outer surface side is thus improved.

BRIEF DESCRIPTION OF DRAWINGS

FIG. 1(a) shows the case where a base material layer is a single layer, and FIG. 1(b) shows the case where a plurality of base material layers is stacked.

FIG. 2(a) shows bulked yarn and FIG. 2(b) shows ordinary glass fibers (twisted yarn).

FIG. 3(b) is a five times enlarged image of FIG. 3(a), and FIG. 3(c) is a ten times enlarged image of FIG. 3(a).

FIG. 7(a) is an image of Example 1, and FIG. 7(b) is an image of Comparative Example 1.

FIG. 8(a) is an image of Example 1, FIG. 8(b) is an image of Example 2, FIG. 8(c) is an image of Comparative Example 1, FIG. 8(d) is an image of Comparative Example 2, FIG. 8(e) is an image of Comparative Example 3, FIG. 8(f) is an image of Comparative Example 4, and FIG. 8(g) is an image of Comparative Example 5.

FIG. 9(a) is an image of Example 1, FIG. 9(b) is an image of Example 2, FIG. 9(c) is an image of Comparative Example 1, FIG. 9(d) is an image of Comparative Example 2, FIG. 9(e) is an image of Comparative Example 3, FIG. 9(f) is an image of Comparative Example 4, and FIG. 9(g) is an image of Comparative Example 5.

FIG. 10(a) illustrates a common example of using a hot press cushioning material, and FIG. 10(b) illustrates a common process up to hot press.

DESCRIPTION OF EMBODIMENTS

Figure 1:
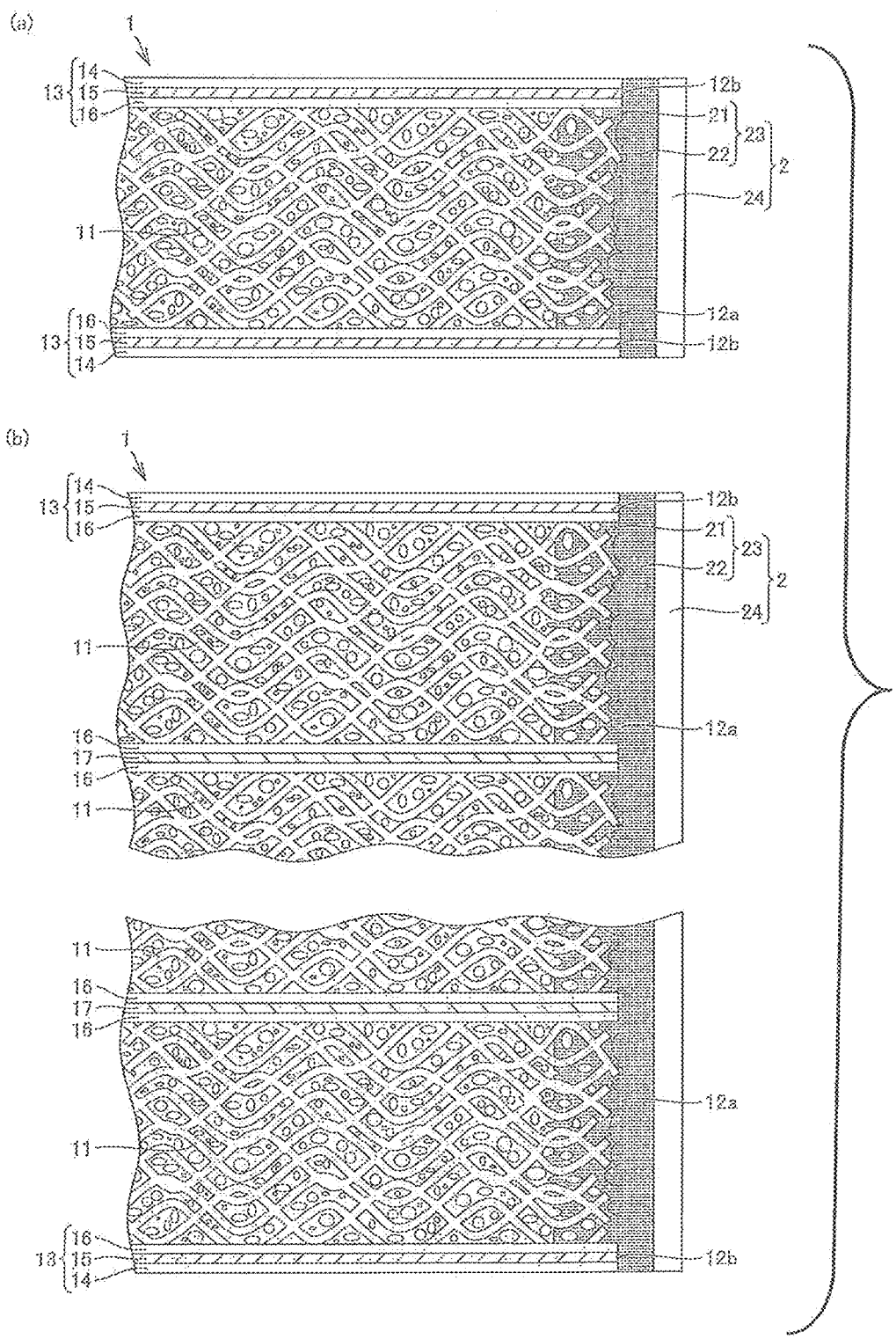
FIG. 1 shows schematic sections of a hot press cushioning material according to an embodiment of the present invention, where

An embodiment of the present invention will be described in detail with reference to the accompanying drawings. The same or corresponding parts in the drawings are denoted by the same reference signs, and description thereof will not be repeated.

Hereinafter, an embodiment of the present invention will be described.

FIG. 1(a) shows a hot press cushioning material 1 according to an embodiment of the present invention. The illustrated hot press cushioning material 1 includes a base material layer 11 that is in the form of a plate and that contains fibers, surface layers 13 on the front and back surfaces of the base material layer 11, and an end face seal 2 covering an outer end face 12a of the base material layer 11.

The surface layers 13 are provided mainly in order to provide releasability to the hot press cushioning material 1. Each surface layer 13 includes a base 15 such as, e.g., woven fabric, paper, or non-woven fabric and a thin film portion 14, such as, e.g., heat resistant resin, applied to the surface of the base 15. Each surface layer 13 is bonded to the base material layer 11 by, e.g., a fluororubber adhesive 16. The outer end face 12a of the base material layer 11 is flush with outer end faces 12b of the surface layers 13.

The base material layer 11 in one embodiment is a fiber-rubber composite material layer composed of woven fabric and rubber with which the woven fabric has been impregnated. Bulked yarn composed of glass fibers is used as either or both of the warp and weft of the woven fabric. This fiber-rubber composite material layer has internal voids. The fiber-rubber composite material layer has a thickness of about 0.5 mm to 5 mm and is in the form of a sheet.

Figure 2:
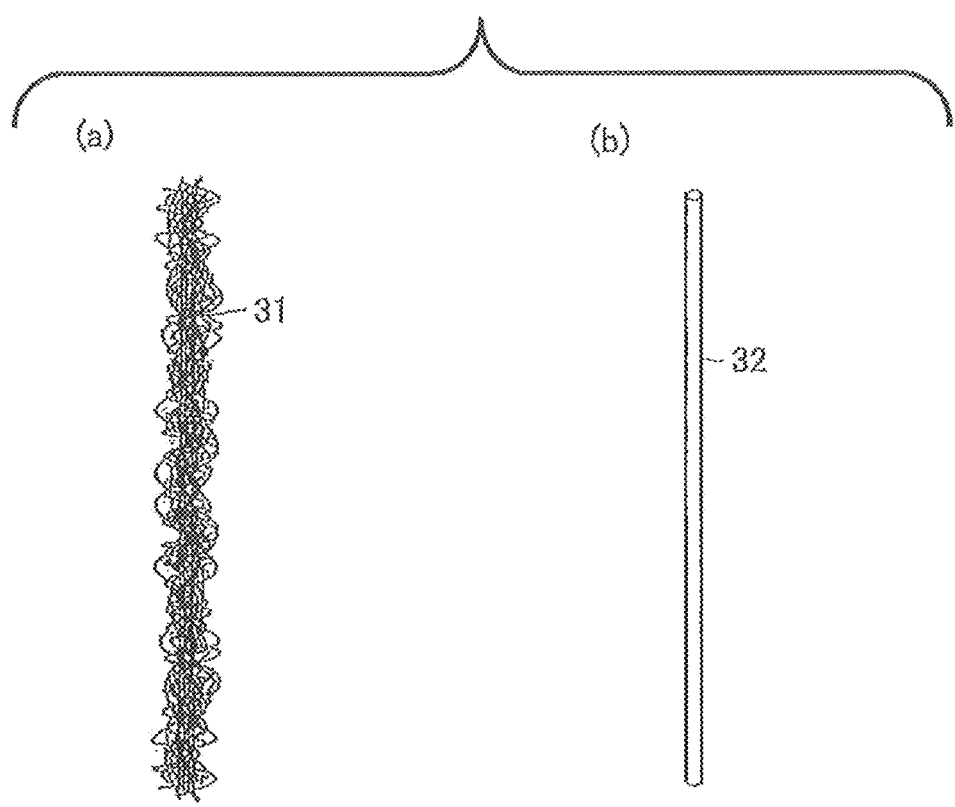
FIG. 2 shows fibers that are used for the base material layer, where

FIG. 2(a) shows bulked yarn 31 composed of glass fibers and suitable as bulked yarn that is a constituent material of the base material layer 11. The bulked yarn 31 is finished yarn made bulky like wool yarn by opening fibers of single yarn or bulking twisted yarn by air jet texturing. The bulked yarn 31 can be appropriately impregnated with rubber as the yarn itself has many voids.

FIG. 2(b) shows single yarn or twisted yarn that is ordinary glass fiber yarn 32. The woven fabric in the fiber-rubber composite material layer may be woven fabric formed using the bulked yarn 31 as one of the warp and the weft and the ordinary glass fiber yarn 32 as the other, or may be woven fabric formed using the bulked yarn 31 as both the warp and the weft.

The fiber-rubber composite material layer that forms the base material layer 11 includes woven fabric and rubber with which the woven fabric has been impregnated. Preferably, the woven fabric is impregnated with the rubber to fill voids in the entire woven fabric so that the volume ratio of the rubber to the fibers forming the woven fabric is 5 to 50%. The volume ratio is more preferably 5 to 35%. The voids in the woven fabric are not completely closed by the rubber and the fiber-rubber composite material layer has a certain level of void properties. The void fraction of the fiber-rubber composite material layer is preferably 20 to 65%, more preferably 25 to 65%.

In the case where the base material layer 11 is the woven fabric-rubber composite material layer, the rubber with which the woven fabric is impregnated is preferably one or more materials selected from the group consisting of fluororubber, EPM, EPDM, hydrogenated nitrile rubber, silicone rubber, acrylic rubber, and butyl rubber.

Figure 3:
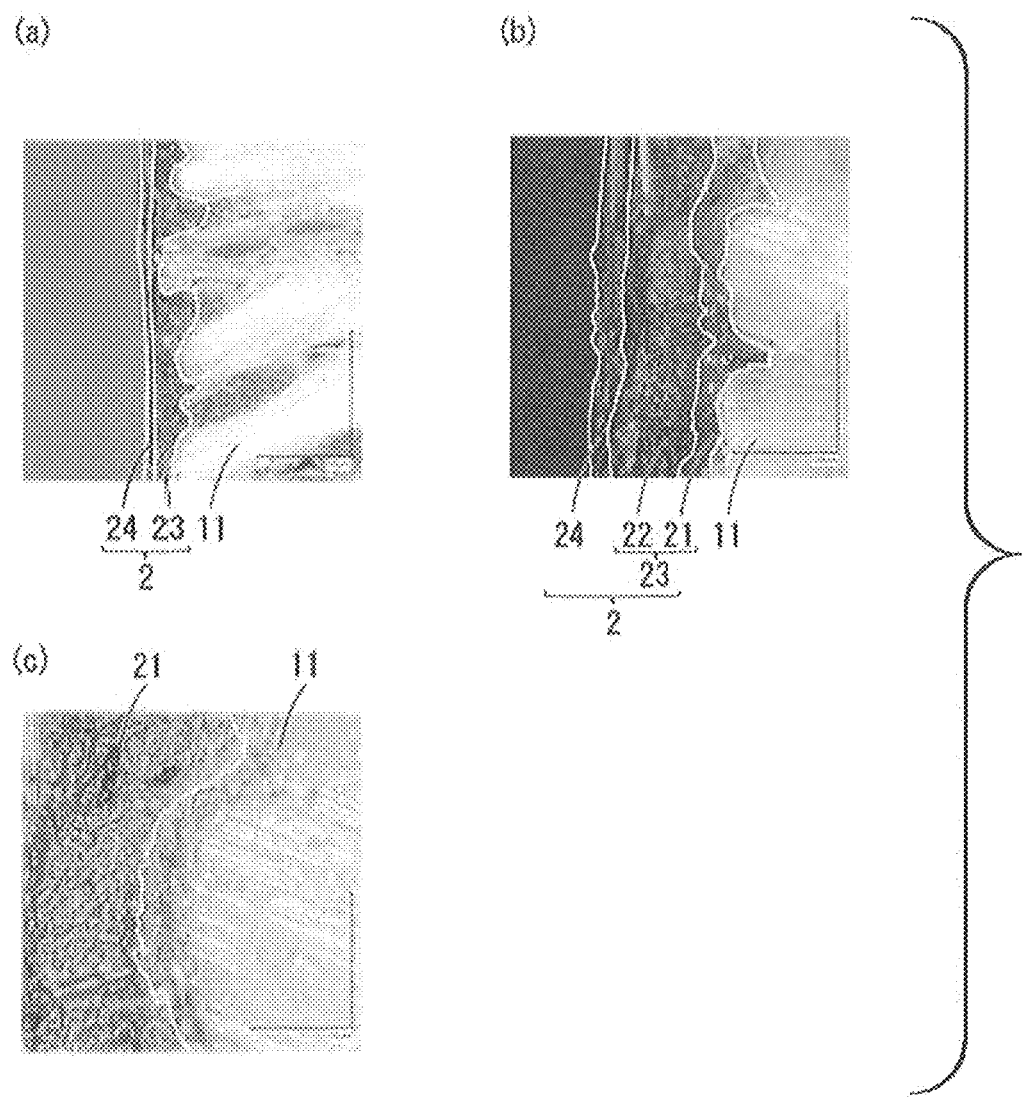
FIG. 3 shows images of a portion near the outer end face of the base material layer, where

FIGS. 3 (a) to 3 (c) are images of a portion near the outer end face 12a with the end face seal 2 attached thereto. FIG. 3(b) is a five times enlarged image of FIG. 3(a), and FIG. 3(c) is a ten times enlarged image of FIG. 3(a). In order to facilitate understanding, boundaries are shown by white lines. As shown in FIGS. 1 (a) and 3(a), the end face seal 2 includes a heat resistant elastic body 23 having penetrated the outer end face 12a of the base material layer 11 and a heat resistant resin 24 attached to the outer surface of the heat resistant elastic body 23. The end face seal 2 covers not only the outer end face 12a of the base material layer 11 but also the outer end faces 12b of the surface layers 13.

The heat resistant elastic body 23 is one kind of rubber or a mixture of two or more kind of rubbers selected from the group consisting of fluororubber, EPM, EPDM, hydrogenated nitrile rubber, silicone rubber, acrylic rubber, and butyl rubber.

The heat resistant elastic body 23 has a first portion 21 having penetrated the base material layer 11 inward from the outer end face 12a and a second portion 22 that does not penetrate the base material layer 11. The first portion 21 and the second portion 22 are preferably made of the same material. The first portion 21 and the second portion 22 can thus be made less likely to peel off.

The first portion 21 penetrates the outer end face 12a of the base material layer 11 and enters the voids in the outer end face 12a of the base material layer 11. The first portion 21 thus firmly bonds with the base material layer 11 and fix the fibers in the base material layer 11. This is also shown in FIGS. 3 (b) and 3(c).

The penetration depth of the first portion 21 is 10 µm or more. The penetration depth of the first portion 21 is set to 10 µm or more in order to prevent the end face seal 2 from peeling off from the outer end face 12a of the base material layer 11. The first portion 21 penetrates the base material layer 11 sandwiched between the surface layers 13 inward from the outer end face 12a.

The second portion 22 serves as a cushion against an impact that is applied to the outer end face 12a of the base material layer 11 and also serves to connect the first portion 21 and the heat resistant resin 24. The thickness of the second portion 22, that is, the thickness of the portion sandwiched between the first portion 21 and the heat resistant resin 24, is 10 µm or more. The thickness of the second portion 22 is set to 10 µm or more in order to absorb an impact that is applied to the outer end face 12a. The second portion 22 covers the outer end faces 12b that is applied to the surface layers 13. Since the surface layers 13 do not have voids, the second portion 22 does not penetrate the outer end faces 12b of the surface layers 13. The second portion 22 is therefore attached to the outer end faces 12b of the surface layers 13.

As described above, the heat resistant resin 24 is attached to the outer surface of the heat resistant elastic body 23.

The heat resistant resin 24 is, e.g., a film made of heat resistant resin. The heat resistant resin 24 is at least one resin selected from the group consisting of fluororesin, polyimide resin, polyamide resin, PPS resin, PET resin, polyurethane resin, polypropylene resin, and polyethylene resin.

The thickness of the heat resistant resin 24 is preferably 50 µm or less, more preferably 25 µm or more and 50 µm or less.

As described above, in the hot press cushioning material 1 according to the present embodiment, the end face seal 2 covering the outer end face 12a of the base material layer 11 includes the heat resistant elastic body 23 having penetrated the outer end face 12a of the base material layer 11 and the heat resistant resin 24 attached to the outer surface of the heat resistant elastic body 23. Since the outer end faces 12a of the base material layer 11 have holes and bumps, the bonding area between the outer end faces 12a and the heat resistant elastic body 23 is increased, and adhesion strength is improved. The outer end faces 12a of the base material layer 11 and the heat resistant elastic body 23 are bonded by the anchor effect that is provided as the heat resistant elastic body 23 fills the holes and bumps on the outer end faces 12a and is cured. The adhesion strength is therefore further improved. Moreover, since the heat resistant resin 24 covers the outer surface of the heat resistant elastic body 23, coming-off of fibers can be prevented even when an impact is repeatedly applied to the outer end face 12a.

In the hot press cushioning material 1 according to the present embodiment, the heat resistant elastic body 23 of the end face seal 2 includes the first portion 21 having penetrated the base material layer 11 inward from the outer end face 12a and the second portion 22 that is located on the outer surface side of the first portion 21 and that does not penetrate the base material layer 11. The end face seal 2 and the base material layer 11 are thus more firmly bonded by the anchor effect between the outer end face 12a of the base material layer 11 and the first portion 21. Moreover, resistance to an impact that is applied to the outer end face 12a is improved due to the elasticity of the second portion 22.

The stacked structure of the hot press cushioning material 1 according to the embodiment of the present invention can be in various forms. For example, as shown in FIG. 1(a), the stacked structure may be a single layer of the base material layer 11 containing fibers, or the surface layer 13 may be provided on the front and back surfaces of the base material layer 11. As shown in FIG. 1(b), a plurality of base material layers 11, e.g., two to six base material layers 11, may be stacked and bonded together by, e.g., an adhesive layer including a fluororubber adhesive 16 and a base 17. Alternatively, other layer such as a rubber layer or a reinforcing cloth layer may be interposed between the base material layers 11 (not shown).

Figure 4:
FIG. 4 is a sectional view of an end face seal material.

As shown in FIG. 4, an end face seal material 2a before being attached to the outer end face 12a of the base material layer 11, namely an unused end face seal material 2a, has a release film 25 attached to the unvulcanized heat resistant elastic body 23. The release film 25 is, e.g., a PET film coated with silicone on one side.

The base material layer 11 and the first portion 21 have an appropriate amount of voids. The hot press cushioning material 1 therefore has excellent cushioning properties and can uniformly apply heat and pressure to a laminate material during hot press.

Figure 5:
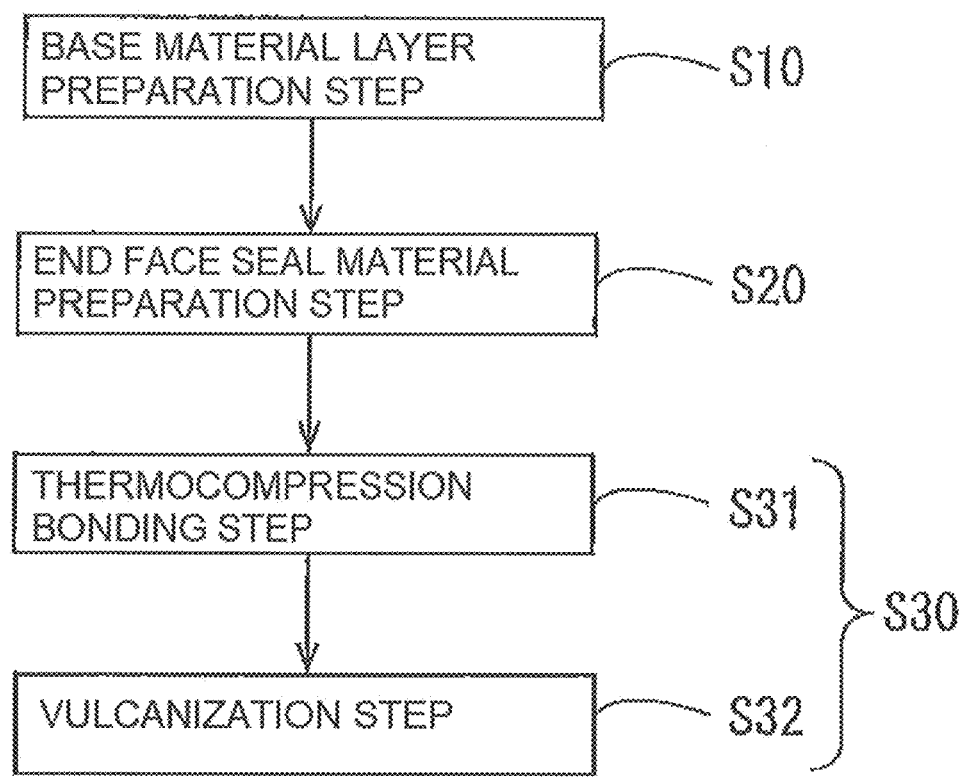
FIG. 5 is a flowchart of a method for manufacturing a hot press cushioning material according to an embodiment of the present invention.

Next, a method for manufacturing the hot press cushioning material according to the present embodiment will be described with reference to FIG. 5.

First, the base material layer 11 that is in the form of a plate and that contains such fibers as described above is prepared (step S10). In this step (step S10), woven fabric is impregnated with a rubber solution and is dried to remove the solution, and a vulcanization process is performed. As shown in FIG. 1(b), a plurality of base material layers 11 may be stacked with the adhesive layer, which includes the fluororubber adhesive 16 and the base 17, interposed therebetween, and the surface layer 13 may be provided on the front and back surfaces of the stack.

The surface layer 13 may be provided on the front and back surfaces of the base material layer 11. The surface layer 13 includes the thin film portion 14 applied to the base 15, and is bonded to the base material layer 11 by, e.g., the fluororubber adhesive 16.

Next, the end face seal material 2a for covering the outer end face 12a of the base material layer 11 is prepared (step S20). In this step (step S20), the heat resistant elastic body 23, the heat resistant resin 24, and the release film 25 are prepared in order to manufacture the end face seal material 2a shown in FIG. 4.

In this step (step S20), the silicone-coated surface of the release film 25 is coated with the heat resistant elastic body 23 and is dried to produce an unvulcanized heat resistant elastic body 23. The heat resistant resin 24 and this heat resistant elastic body 23 are laminated together. The end face seal material 2a including the release film 25 is thus prepared.

In this step (step S20), in order to increase bonding strength between the heat resistant resin 24 and the heat resistant elastic body 23, it is preferable to perform surface treatment on the surface of the heat resistant resin 24 that contacts the heat resistant elastic body 23 such as, e.g., corona treatment, plasma treatment, or priming.

Thereafter, a covering step is performed in which the end face seal material 2a is attached to the outer end face 12a of the vulcanized base material layer 11 to cover the outer end face 12a of the base material layer (step S30). Specifically, this step (step S30) includes: a thermocompression bonding step (step S31) of thermocompression bonding the heat resistant elastic body 23 of the end face seal material 2a and the outer end face 12a of the base material layer 11 so that the end face seal material 2a covers the outer end face 12a of the base material layer 11; and a vulcanization step (step S32) of vulcanizing the heat resistant elastic body 23 of the end face seal material 2a. In the case where the surface layers 13 are provided, the end face seal material 2a also covers the outer end faces 12b of the surface layers 13.

In the thermocompression bonding step (step S31), the release film 25 of the prepared end face seal material 2a is peeled off, and the heat resistant elastic body 23 of the end face seal material 2a is attached to the outer end face 12a of the base material layer 11. This step (step S31) is performed using a heating and pressing terminal such as, e.g., an iron or a heat roll. The heat resistant elastic body 23 is thus thermocompression bonded in an unvulcanized state. This allows the heat resistant elastic body 23 to penetrate the voids in the outer end face 12a of the base material layer 11. Since the outer end faces 12b of the surface layers 13 do not have voids, the heat resistant elastic body 23 does not permeate the outer end faces 12b of the surface layers 13.

In the vulcanization step (step S32), the cushioning material 1 having been subjected to thermocompression bonding is placed into a heating furnace and heated at 180° C. or higher for 1 hour to vulcanize and cure the heat resistant elastic body 23. The heat resistant elastic body 23 having penetrated the voids in the outer end face 12a of the base material layer 11 can thus be vulcanized and cured by performing this step under the above conditions. This allows the end face seal material 2a to be firmly attached to the outer end face 12a of the base material layer 11.

In the present embodiment, the method for manufacturing the hot press cushioning material 1 by attaching the end face seal material 2a to the base material layer 11 impregnated with a rubber solution is described as an example. However, the present invention is not limited to this, and the base material layer 11 may be woven fabric not impregnated with rubber.

As described above, the method of the present embodiment includes: the step of preparing the base material layer 11 that is in the form of a plate and that contains fibers (step S10); the step of preparing the end face seal material 2a including the heat resistant elastic body 23 that penetrates the outer end face 12a of the base material layer 11 and the heat resistant resin 24 attached to the outer surface of the heat resistant elastic body 23 (step S20); and the covering step of attaching the end face seal material 2a to the outer end face 12a of the base material layer 11 to cover the outer end face 12a of the base material layer 11 (step S30).

According to the hot press cushioning material and its manufacturing method of the present embodiment, the heat resistant resin 24 is attached to the outer end face 12a of the base material layer 11 by the heat resistant elastic body 23. Accordingly, the contact area between the outer end faces 12a of the base material layer 11 and the heat resistant elastic body 23 can be increased, and the end face seal material 2a can be more firmly attached to the outer end face 12a of the base material layer 11. This can prevent contamination with foreign matter due to coming-off of fibers from the base material layer 11.

The covering step (step S30) includes: the thermocompression bonding step (step S31) of thermocompression bonding the heat resistant elastic body 23 of the end face seal material 2a and the outer end face 12a of the base material layer 11 so that the end face seal material 2a covers the outer end face 12a of the base material layer 11; and the vulcanization step (step S32) of vulcanizing the heat resistant elastic body 23 of the end face seal material 2a.

According to the hot press cushioning material and its manufacturing method of the present embodiment, the heat resistant elastic body 23 penetrates the voids in the base material layer 11 by the thermocompression bonding step (step S31), whereby the first portion 21 is formed. The first portion 21 is then cured by the vulcanization step (step S32). This provides the anchor effect and allows the end face seal material 2a to be firmly attached to the outer end face 12a of the base material layer 11.

EXAMPLES

The present invention will be described in more detail using examples. The present invention is not limited to these examples.

Table 1 shows the evaluation results of experiments conducted for Examples 1 and 2 and Comparative Examples 1 to 5.

First, base material layers were prepared (step S10). The base material layers used were glass woven fabrics using bulked yarn, "T860" (manufactured by UNITIKA LTD.). The weft of these woven fabrics was bulked yarn produced by bulking twisted yarn of count 305 tex composed of 3,200 E-glass fibers (fiber diameter: 6 μm), and the warp of these woven fabrics was unbulked twisted yarn of count 135 tex composed of 1,600 E-glass fibers (fiber diameter: 6 μm). These woven fabrics were double weave fabrics, and each woven fabric had a weight of 850 g/m², a thickness of 1.02 mm, and a void fraction of 67%. An unvulcanized fluororubber solution was also prepared by dissolving unvulcanized fluororubber at a predetermined concentration in a solvent of butyl acetate and methyl ketone mixed at a mass ratio of 1:1. Each glass woven fabric was immersed in the unvulcanized fluororubber solution and was then squeezed by two rolls. Thereafter, each of the resultant glass woven fabrics was sufficiently dried to remove the solvent. Four of the base material layers thus produced were stacked with an adhesive sheet therebetween, and a surface layer was placed on the upper and lower surfaces of the stack. The resultant stack was bonded together to produce a cushioning material.

Subsequently, an end face seal material was prepared (step S20). A release film with a thickness of 50 μm was prepared, and a silicone-coated surface of the release film was coated with fluororubber paint with a viscosity of 10 Pa·s. The resultant release film was dried at 120° C. or lower to form an unvulcanized fluororubber layer with a thickness of 100 μm on the release film. A fluorine film with a thickness of 50 μm (FEP film NF-0050B1 manufactured by DAIKIN INDUSTRIES, LTD.) was then attached to the surface of the unvulcanized fluororubber layer by lamination. The fluorine film used was a fluorine film that had been surface-treated with corona, plasma, primer, etc. so as to facilitate bonding with fluororubber and that had been treated to prevent peeling-off of the film.

The release film of the end face seal material was peeled off, and the resultant end face seal material was attached to the outer end face of the cushioning material. Thermocompression bonding was then performed by sliding a heating and pressing terminal set to 150° C. under a load of 5 kgf at 1 sec/cm to cause the unvulcanized fluororubber to enter voids in the base material layers of the cushioning material (step S31).

A vulcanization step was performed (step S32). Heat treatment was performed at 180° C. for 1 hour in a heating furnace. The vulcanization temperature is preferably 180° C. or higher and 230° C. or lower. The sample thus prepared by the above process was used as Example 1. Example 2 was the same as Example 1 except that a polyimide film with a thickness of 25 μm was used instead of the fluorine film with a thickness of 50 μm.

A method for manufacturing cushioning materials of Comparative Examples 1 to 5 described below was basically similar to the method for producing the cushioning material of Example 1, but the treatment conditions for the outer end face were different from those in Example 1 as shown in Table 1 below.

Comparative Example 1 was a cushioning material whose outer end face had not been subjected to any treatment.

An end face seal material was produced by coating a silicone-coated surface of a release film with a thickness of 50 μm with unvulcanized fluororubber paint and drying the resultant release film to form an unvulcanized fluororubber layer with a thickness of 100 μm on the release film. Thermocompression bonding was then performed by sliding a heating and pressing terminal set to 150° C. over the outer end faces of the base material layers of the cushioning material under a load of 5 kgf at 1 sec/cm. The unvulcanized fluororubber was thus caused to penetrate fibers in the base material layers of the cushioning material. The release film was peeled off, and heat treatment was performed in a heating furnace to vulcanize the fluororubber. Comparative Example 2 was thus produced. The heat treatment conditions were the same as those for Example 1.

Comparative Example 3 was a cushioning material produced by causing fluororubber paint to penetrate the cushioning material from its outer end face and drying and curing the fluororubber paint. The fluororubber paint used was a mixture of DAI-EL LATEX GLS-213LA and GL200B (curing agent) with a mixing ratio of 20:1. The viscosity of the fluororubber paint was 0.13 Pa·s. The thickness of the portion where the fluororubber paint penetrated was 0.5 mm, and the void fraction of the portion where the fluororubber paint penetrated was 36%.

Comparative Example 4 was a cushioning material with its outer end face coated with silicone resin by applying silicone resin with a viscosity of 20 Pa·s to the outer end face and drying and curing the silicone resin.

Comparative Example 5 was a cushioning material with its outer end face coated with fluororubber paint by applying fluororubber paint with a viscosity of 11 Pa·s to the outer end face and drying and curing the fluororubber paint.

(Evaluation Method)

A press compression test, an impact test, and a rubbing test were conducted for Examples 1 and 2 and Comparative Examples 1 to 5.

Press compression test: With a press machine, the cushioning material pressed with 4 MPa in the thickness direction was heated at 230° C. for 60 minutes and then cooled for 10 minutes. The pressure on the cushioning material was then released. This press was repeated 100 times.

Figure 6:
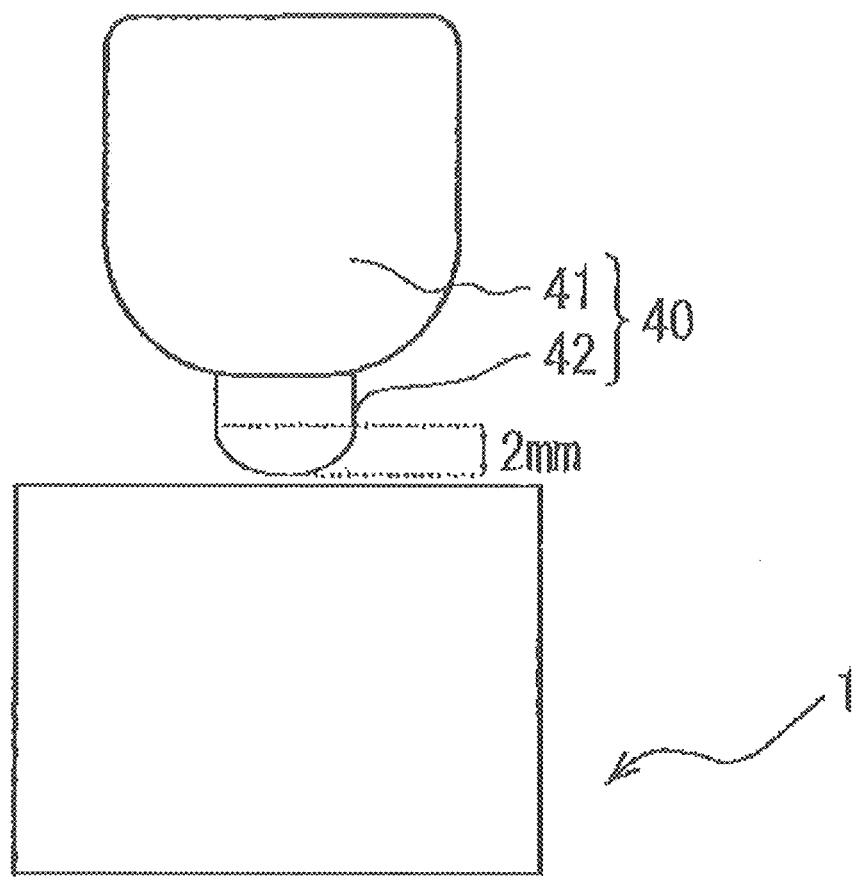
FIG. 6 schematically shows a test jig.

Impact test: As shown in FIG. 6, a hammer 40 was used which was composed of a jig 41 for a pressing tester and a spherical terminal 42 attached to the jig 41, the spherical terminal 42 being made of SUS and having a diameter of 10 mm and a height of 2 mm. A test of applying an impact with a load of 20 kgf by hitting the outer end face of the cushioning material with the hammer 40 at a speed of 200 mm/min was repeated 50 times.

Rubbing test: The end face of the sample was pressed against sandpaper and was rubbed back and forth over a distance of 10 cm 20 times, namely for 20 double rubs, while applying a pressure of 1 kg/cm². The sandpaper used was 800 grit sandpaper.

The press compression test, the impact test, and the rubbing test were conducted under the above conditions for the cushioning materials of Examples 1 and 2 and Comparative Examples 1 to 5. The results are shown in Table 1. In Table 1, "○" indicates that peeling-off of the end face seal, fiber fuzzing, etc. did not occur, "Δ" indicates that the end face seal partly peeled off, and "x" indicates that peeling-off of the end face seal occurred and falling off of the heat resistant elastic body or the heat resistant resin was able to be observed.

TABLE 1

| | End Face Treatment Conditions | Press Compression Test | Impact Test | Rubbing Test |
|---|---|---|---|---|
| EXAMPLE 1 | 100 μm Fluororubber + 50 μm Fluorine Film | ○ | ○ | ○ |
| EXAMPLE 2 | 100 μm Fluororubber + 25 μm Polyimide Film | ○ | Δ | ○ |
| COMPARATIVE EXAMPLE 1 | Untreated | x | x | x |
| COMPARATIVE EXAMPLE 2 | Attach 100 μm Fluororubber Sheet | ○ | x | x |
| COMPARATIVE EXAMPLE 3 | Coat with Fluororubber (Viscosity: 0.13Pa · s) | ○ | x | x |
| COMPARATIVE EXAMPLE 4 | Coat with Silicone Resin | ○ | x | x |
| COMPARATIVE EXAMPLE 5 | Coat with Fluororubber (Viscosity: 11Pa · s) | ○ | x | x |

(Evaluation Results)

Figure 7:
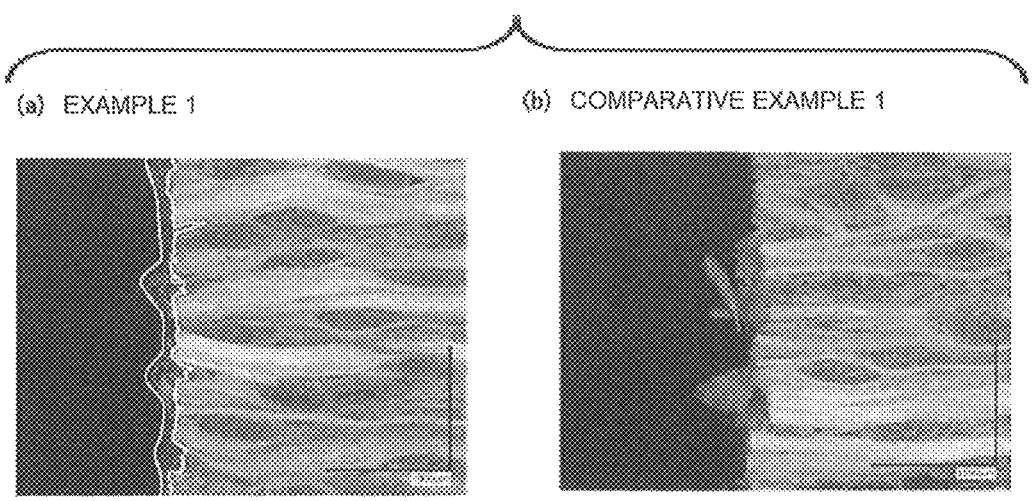
FIG. 7 shows images of the outer end faces of cushioning materials after a press compression test, where
Figure 8:
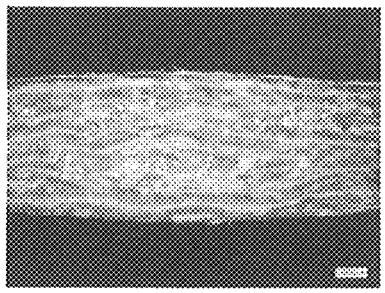
FIG. 8 shows images of the outer end faces of cushioning materials after an impact test, where
Figure 8:
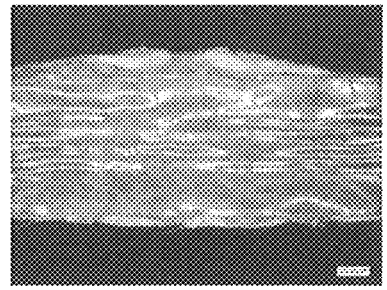
Figure 8:
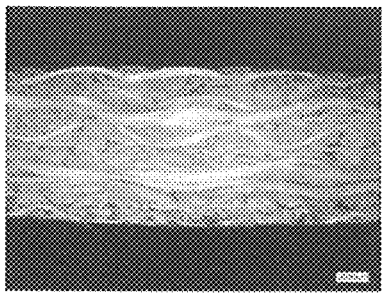
Figure 8:
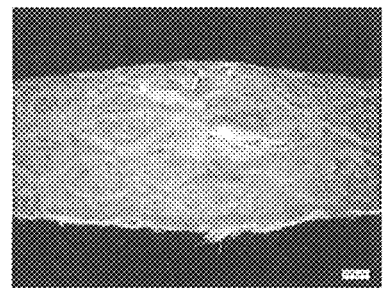
Figure 8:
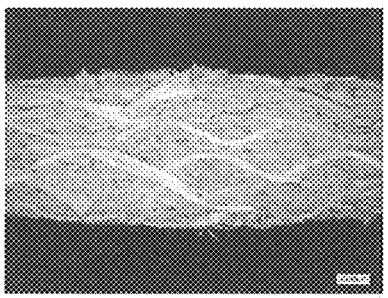
Figure 8:
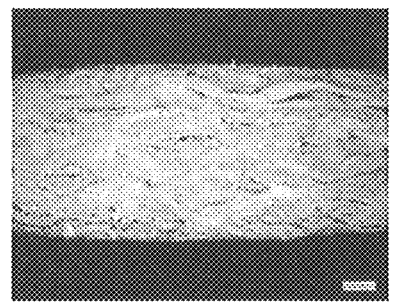
Figure 8:
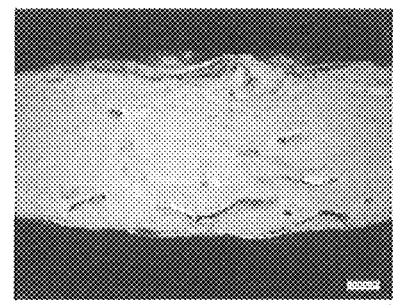
Figure 9:
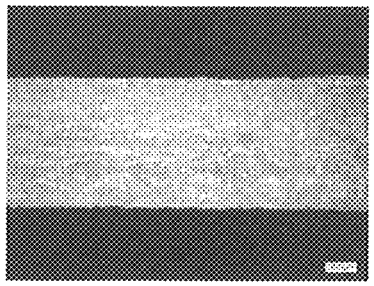
FIG. 9 shows images of the outer end faces of cushioning materials after a rubbing test, where
Figure 9:
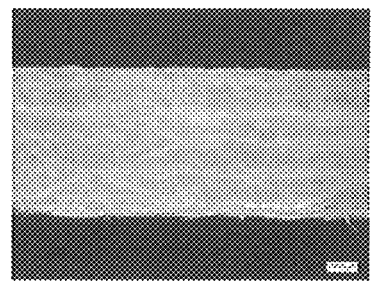
Figure 9:
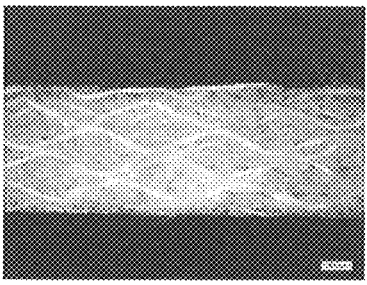
Figure 9:
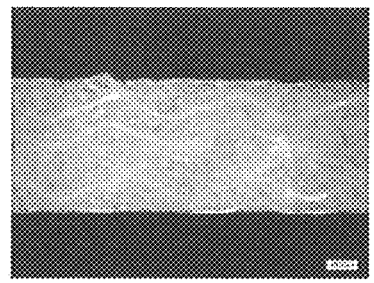
Figure 9:
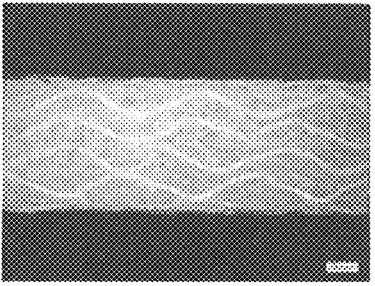
Figure 9:
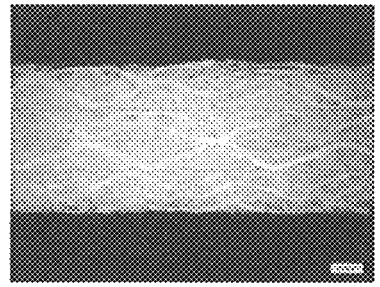
Figure 9:
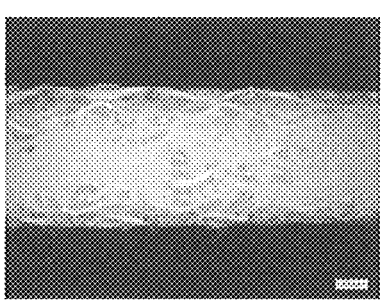
Figure 10:
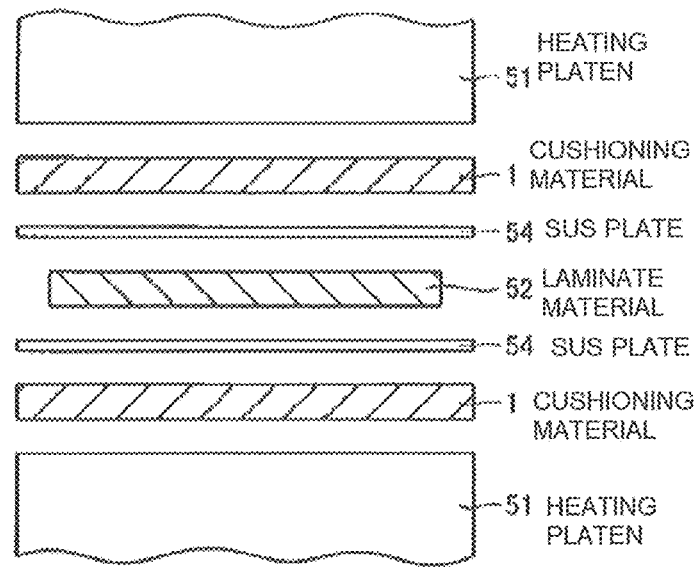
FIG. 10 schematically shows a common embodiment using a hot press cushioning material, where
Figure 10:
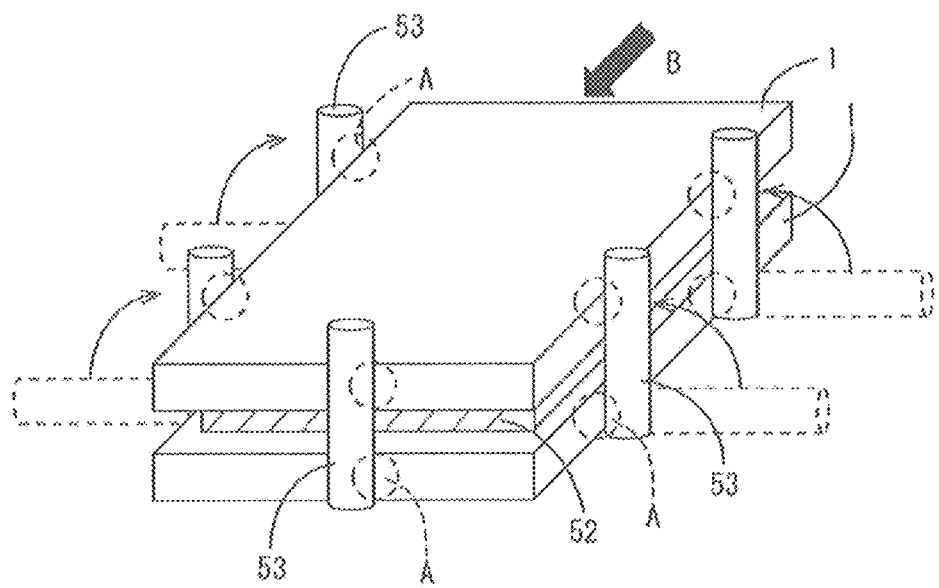

The results are shown in FIGS. 7 to 9. FIG. 7 shows images of the end faces of the cushioning materials after the press compression test, FIG. 8 shows images of the end faces of the cushioning materials after the impact test, and FIG. 9 shows images of the end faces of the cushioning materials after the rubbing test. The vertical and horizontal directions in the description of the evaluation results shown in FIGS. 7 to 9 match the vertical and horizontal directions in the figures.

In the press compression test, Example 1 (FIG. 7(a)) and Example 2 of the present invention had no problem. That is, no fiber fraying or fuzzing was observed on the outer end face. On the other hand, fiber fraying, fuzz shedding, etc. were observed in Comparative Example 1 (FIG. 7(b)). No fiber fraying or fuzzing was observed on the outer end faces of Comparative Examples 2 to 5.

The results of the press compression test show that the cushioning materials of Examples 1 and 2 are more resistant to an impact in the vertical direction than the cushioning material of Comparative Example 1.

In the impact test, Example 1 (FIG. 8(a)) had no problem. That is, no fiber fraying, fuzz shedding, damage to the heat resistant elastic body, etc. were observed. In Example 2 (FIG. 8(b)), partial peeling-off of the end face seal was observed on the upper part of the outer end face.

On the other hand, in Comparative Example 1 (FIG. 8(c)), fibers were exposed on the entire surface, and fiber fraying and fuzz shedding were observed. In Comparative Example 2 (FIG. 8(d)), damage to the heat resistant elastic body and fuzz shedding were observed on the lower and middle parts of the outer end face. In Comparative Example 3 (FIG. 8(e)), fiber fraying occurred on the upper and lower ends of the outer end face, and fuzz shedding was observed. In Comparative Example 4 (FIG. 8(f)), fibers were exposed on the entire surface, and damage and falling-off of the heat resistant elastic body, fiber fraying, and fuzz shedding were observed. In Comparative Example 5 (FIG. 8(g)), fibers were exposed on the entire surface, and damage and falling-off of the heat resistant elastic body, fiber fraying, and fuzz shedding were observed.

The results of the impact test show that Examples 1 and 2 are more resistant to an impact that is repeatedly applied to the end face of the cushioning material than Comparative Examples 1 to 5.

In the rubbing test, Example 1 (FIG. 9(a)) had no problem, and no fiber fuzzing was observed. Similarly, Example 2 (FIG. 9(b)) also had no problem such as fuzz shedding.

On the other hand, in Comparative Example 1 (FIG. 9(c)), fiber fuzzing occurred on the entire surface, and fiber fraying and fuzz shedding were observed. In Comparative Example 2 (FIG. 9(d)), falling-off of the heat resistant elastic body and fiber fuzzing were observed especially on the upper left part and the right part of the outer end face. In Comparative Example 3 (FIG. 9(e)), the heat resistant elastic body fell off from the entire surface, and fiber fuzzing was observed. In Comparative Example 4 (FIG. 9(f)), falling-off of the heat resistant elastic body and fiber fuzzing were observed especially on the upper and lower parts of the outer end face. In Comparative Example 5 (FIG. 9(g)), falling-off of the heat resistant elastic body and fiber fuzzing were observed especially on the upper and lower parts of the outer end face.

The results of the rubbing test show that, in Examples 1 and 2, fiber fuzzing etc. is less likely to occur even if the end face of the cushioning material is rubbed off, as compared to Comparative Examples 1 to 5.

As described the above, according to Examples 1 and 2, hot press cushioning materials were able to be obtained which can prevent fiber fraying and fuzz shedding from the outer end face of the cushioning material even when the cushioning material is locally subjected to a large impact or friction.

The embodiment disclosed herein should be construed as illustrative in all respects and not as restrictive. The scope of the present invention is not defined by the above description but by the claims, and is intended to include all modifications that are made without departing from the scope of the claims.

REFERENCE SIGNS LIST

1: Hot Press Cushioning material, 2: End Face Seal, 2a: End Face Seal Material, 11: Base Material Layer, 12a, 12b: Outer End Face, 13: Surface Layer, 14: Thin Film Portion, 15, 17: Base, 16: Fluororubber Adhesive, 21: First Portion, 22: Second Portion, 23: Heat Resistant Elastic Body, 24: Heat Resistant Resin, 25: Release Film, 31: Bulked Yarn, 32: Glass Fiber Yarn, 40: Hammer, 41: Jig for Pressing Tester, 42: Spherical Terminal, 51: Heating Platen, 52: Laminate material, 53: Alignment Pin, 54: Mirror Plate

The invention claimed is:

1. A hot press cushioning material, comprising: a base material layer that is in a form of a plate and that contains fibers; and an end face seal covering an outer end face of the base material layer, wherein the end face seal includes a heat resistant elastic body having penetrated the outer end face of the base material layer and a heat resistant resin attached to an outer surface of the heat resistant elastic body, wherein the heat resistant elastic body includes a first portion having penetrated the base material layer inward from the outer end face and a second portion that is located on an outer surface side of the first portion and that does not penetrate the base material layer.

2. The hot press cushioning material according to claim 1, wherein the first portion of the heat resistant elastic body has a penetration depth of 10 μm or more, and the second portion sandwiched between the first portion and the heat resistant resin has a thickness of 10 μm or more.

3. The hot press cushioning material according to claim 1, wherein a surface layer is provided on front and back surfaces of the base material layer, and the first portion of the heat resistant elastic body has penetrated the base material layer sandwiched between the surface layers inward from the outer end face.

4. The hot press cushioning material according to claim 3, wherein the second portion of the heat resistant elastic body covers outer end faces of the surface layers.

5. The hot press cushioning material according to claim 1, wherein
the heat resistant elastic body contains one kind of rubber or a mixture of two or more kind of rubbers selected from the group consisting of fluororubber, EPM, EPDM, hydrogenated nitrile rubber, silicone rubber, acrylic rubber, and butyl rubber.

6. The hot press cushioning material according to claim 1, wherein
the heat resistant resin contains at least one resin selected from the group consisting of fluororesin, polyimide resin, polyamide resin, PPS resin, PET resin, polyurethane resin, polypropylene resin, and polyethylene resin.

7. The hot press cushioning material according to claim 5, wherein
the heat resistant elastic body is fluororubber, and the heat resistant resin is fluororesin.

* * * * *